April 17, 1928.
E. C. G. ENGLAND
1,666,815
MOTOR VEHICLE
Filed Feb. 6, 1926
5 Sheets-Sheet 1
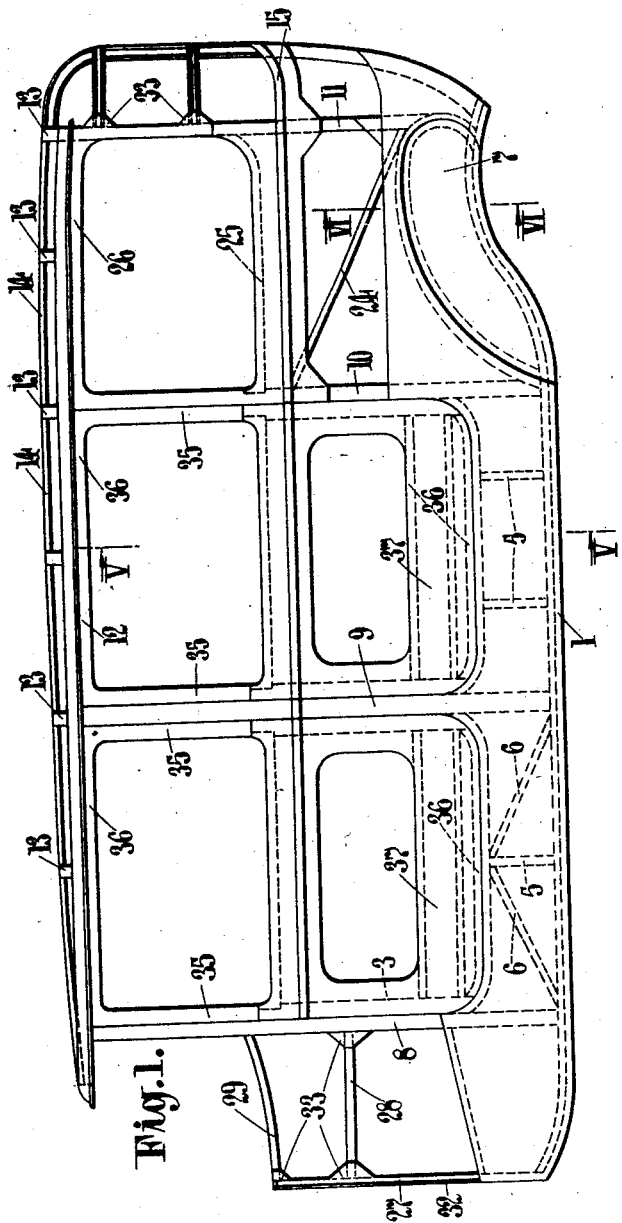
Fig. 1.
INVENTOR
E.C.G. ENGLAND,
BY
ATTORNEY

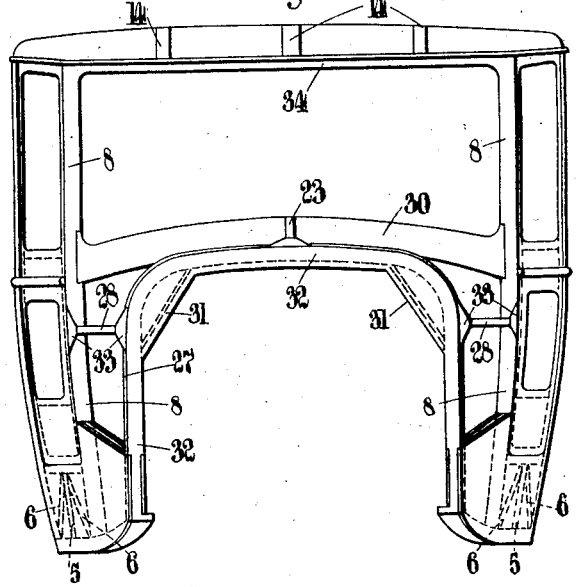
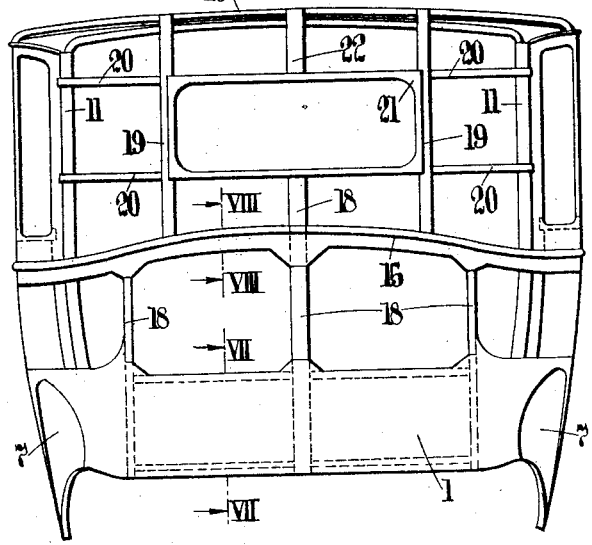

April 17, 1928. 1,666,815
E. C. G. ENGLAND
MOTOR VEHICLE
Filed Feb. 6, 1926    5 Sheets-Sheet 3

INVENTOR
E.C.G. ENGLAND,
BY
ATTORNEY

April 17, 1928.  1,666,815
E. C. G. ENGLAND
MOTOR VEHICLE
Filed Feb. 6, 1926   5 Sheets-Sheet 4
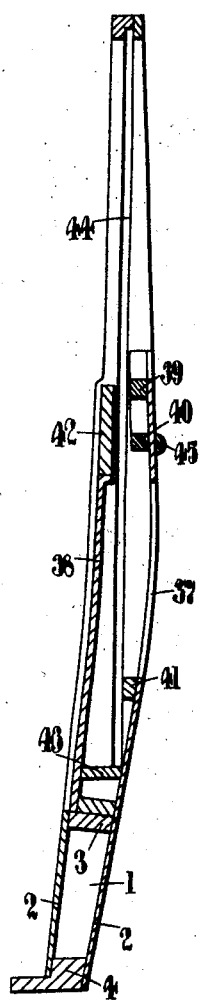
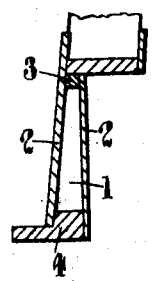
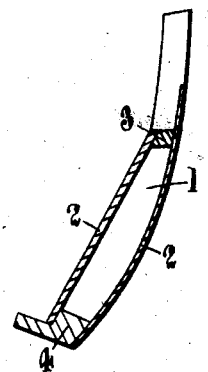

April 17, 1928.  E. C. G. ENGLAND  1,666,815
MOTOR VEHICLE
Filed Feb. 6, 1926   5 Sheets-Sheet 5
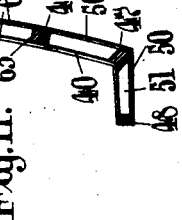
Fig. 11.
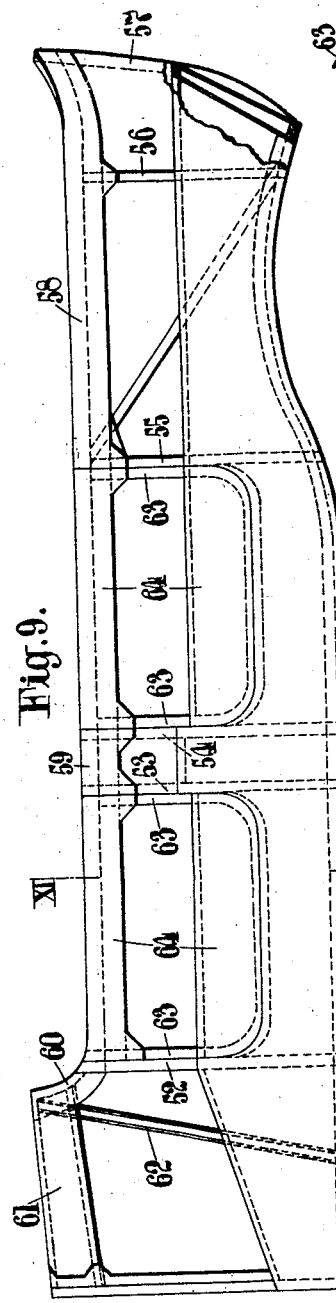
Fig. 9.
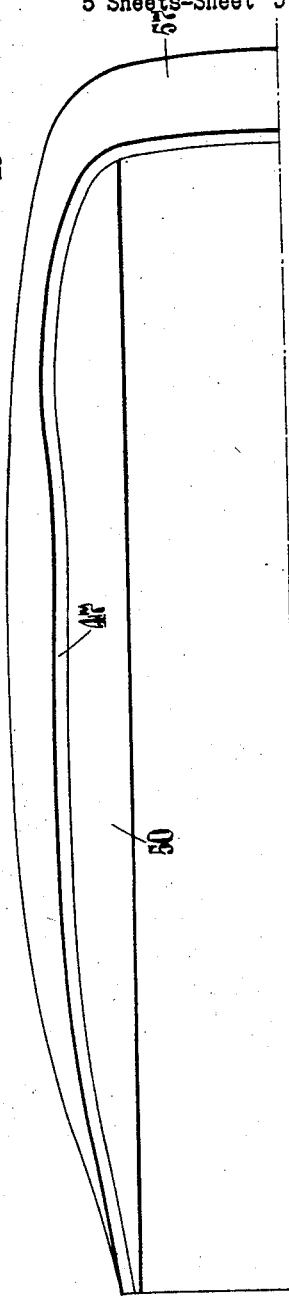
Fig. 10.
INVENTOR
E.C.G. ENGLAND,
BY
ATTORNEY Patented Apr. 17, 1928.

1,666,815

UNITED STATES PATENT OFFICE.

ERIC CECIL GORDON ENGLAND, OF LONDON, ENGLAND.

MOTOR VEHICLE.

Application filed February 6, 1926, Serial No. 86,545, and in Great Britain February 21, 1925.

This invention relates to motor vehicles, and to the type of such vehicles in which the seats are attached to the chassis independently of the body.

The invention has for its object to provide an improved form of body of the type indicated above.

Referring now to the accompanying drawings,

Figure 1, shows a side elevation of a saloon body, constructed according to the invention, while, Figures 2 and 3, show front and rear end elevations respectively of the body shown in Figure 1.

Figure 5, shows a vertical section through the line V—V, on Figure 1.

Figure 6, shows a cross-sectional elevation through the line VI—VI, on Figure 1, while, Figure 7, shows a similar view through the line VII—VII, on Figure 3.

Figure 8, shows a cross-sectional elevation through the line VIII—VIII, on Figure 3.

Figure 9, shows a side elevation of a modified construction of body, while,

Figure 10, shows an inverted semi-plan of same.

Figure 11, shows a cross-section through the line XI—XI, on Figure 9.

Figure 4:
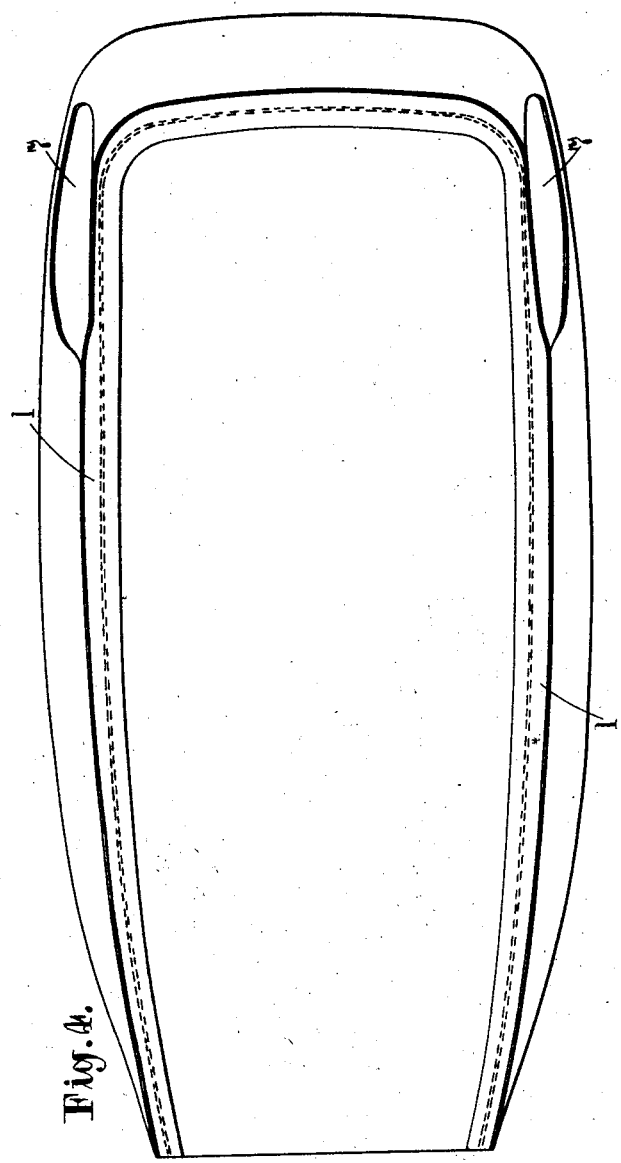
Figure 4, shows an inverted plan of the body shown in Figure 1.

In carrying the invention into effect, according to one form, and as applied by way of example to a motor car body of the saloon type, the member, 1, is formed as a continuous girder of hollow construction, extending along both sides of the body and across the rear end thereof.

The member, 1, is of approximately L-shaped section and is formed with web members, 2, of plywood, and flange members, 3 and 4, of timber, as shown in Figures, 5, 6 and 7.

The flange member, 4, is formed with an inward extension as shown, so as to stiffen the member, 1, laterally.

The member, 1, is also stiffened on each of the longitudinal portions thereof by means of internal upright members, 5, and diagonal members, 6, as shown in Figures 1 and 2.

On the member, 1, on each side thereof, recesses, 7, are formed for the accommodation of the upper portions of the rear wheels.

The lower ends of the upright members, 8, 9, 10 and 11, are built into the member, 1, on each side of the body. These upright members are secured at their upper ends to the top rail, 12, which extends round the sides and front of the body and carries cross-members, 13, and longitudinal members, 14, for supporting the material with which the top of the body is covered.

An intermediate rail, 15, Figure 3, is arranged round the rear portion of the body, the rail being formed of a central member of timber and side members of plywood as shown in Figure 8.

Three uprights, 18, are built into the rail, 15, and into the member, 1, Figure 3, the central upright being extended above the rail.

Two uprights, 19, curved at their upper ends, are built into the rail, 15, at their lower ends, and at their upper ends are built into the rearmost of the cross-members, 13.

Cross-members, 20, extend between the uprights, 19 and 11, while a frame, 21, for the rear window extends between the uprights, 19. A curved member, 22, extends between the centre of the frame, 21, and the rearmost of the cross-members, 13, while the upper end of the central upright, 18, is also connected to this frame.

Between the members, 10 and 11, on each side of the body, a diagonal strut, 24, is disposed; and members, 25, acting as the bottom members of the frame for the rear side window, also extend between the members, 10 and 11. The members, 25, are formed of two vertically spaced timber members, indicated by dotted lines on Figure 1, having plywood strips disposed on each side thereof. Cross-members, 26, also extend between the uprights, 10 and 11, to form the top members of the frame for the rear side windows.

The scuttle is formed by an arched member, 27, Figure 2, built into the forward ends of the member, 1, and members, 28 and 29. The members, 28, extend between the uprights, 8, and the member, 27, while the member, 29, extends between the cross-member, 30, forming the bottom of the front window frame, and the member, 27.

The rounded corners of the member, 27, are stiffened by members, 31, and a plywood facing strip, 32, which covers the front face of the member, 27.

Angled pieces, 33, of plywood, act to stiffen the joints of the members, 28 and 29, with the members, 27 and 8, and also the joints of the members, 20 and 11, Figure 1.

The member, 34, also extends between the uprights, 8, and forms the top member of the front window frame.

The doors are formed of side members, 35, and end members, 36, the lower portion of the doors having on the outside, a plywood frame panel, 37, and on the inside solid panels of plywood, 38, as shown in Figures 1 and 5.

The outside panel, 37, is stiffened by cross-members, 39, 40 and 41, while the inside panel is checked into a cross-member, 42, extending between the side members, 35. A cross-member, 43, also extends between the side members, 35, close to the bottom of the door. The side members, 35, and the top members, 36, have grooves, 44, formed on their inner faces for the window. A beading, 45, extends round the body.

The extension of the flange member, 4, may be of uniform width throughout so as to fill the gap between the body and the chassis, sufficient clearance being left, however, between these parts so as to allow for relative movement between the body and the chassis.

In Figures, 9 to 11, a modified construction of body is illustrated. In these figures, the body is of the open type. The side portions of the member, 1, is of L-section, while the rear portion of this member is of box section.

The side portions of the member, 1, are formed of three timber members, 46, 47 and 48, with plywood side members, 49 and 50. The portion, 51, of the L projects inwards as shown in Figure 10.

The construction of the body is similar to that before described, upright members, 52, 53, 54, 55, 56 and 57, being built into the member, 1, at their lower ends. The upper ends of the members, 55, 56 and 57, are built into the rail, 58, and the upper ends of the members, 53 and 54, are built into short rails, 59. The members, 52, are built into the scuttle which terminates at its rear end in a rail, 60, and which has a panel, 61, of plywood on its upper surface. The scuttle is stiffened by diagonal struts, 62.

The doors are formed as frames, 63, of timber with stiffening strips, 64, of plywood on their upper and lower portions.

The bodies above described are preferably supported on the chassis at three points only, for example two points near the front ends of the member, 1, and at a central point on the transverse portion of the member, 1. The body, may, however, be supported on the chassis at a greater number of points, if desired. Rubber or other sound-deadening material may be inserted at the points of support.

The bodies above described may be covered in sheet metal, veneer, fabric or any other suitable material.

The member, 1, may in some cases be constructed with a transverse portion across the front of the body as well as at the rear thereof, as above described.

By means of the invention, an exceedingly light yet rigid construction of body is provided which effectively resists lateral whip or distortion and in which rattling or drumming of the body components is practically eliminated.

Although the invention has been described as applied by way of example to a body of the saloon type and also of the open type, it may also be applied to other types of bodies.

I claim:—

A motor vehicle having in combination, a built-up hollow timber girder member having a section formed of portions angularly disposed to one another, said girder member having timber flange members and plywood web members extending along both sides and an end of said body, a roof frame, spaced upright members interconnecting said roof frame and said girder member together with a rear skeleton frame interconnecting said roof frame, said upright members and said girder member.

In testimony whereof I have signed my name to this specification.

ERIC CECIL GORDON ENGLAND.